UNITED STATES PATENT OFFICE.

SAML. P. CLAYTON, OF SOUTH AMBOY, NEW JERSEY.

IMPROVED MEDICAL COMPOUND.

Specification forming part of Letters Patent No. 52,032, dated January 16, 1866.

*To all whom it may concern:*

Be it known that I, SAMUEL P. CLAYTON, of South Amboy, in the county of Middlesex and State of New Jersey, have invented a new and Improved Composition for the Cure of Sweating Feet; and I do hereby declare that the following is a full, clear, and exact description thereof, which will enable others skilled in the art to fully understand and make use of the same.

This invention consists in a new and useful composition of matter for preventing and curing the disorder or habit of sweating feet. This disorder or habit is very common, and is usually attended with unpleasant and fetid odors, besides being an occasion of sickness from taking cold on sudden changes of temperature, or on undue exposure of the feet to a cold atmosphere. The remedies which have been devised to obviate the effects of this disorder or habit of body, or to cure or prevent it, have not recommended themselves to general use, either because they have been found inefficient or because of their expensiveness.

My invention will be found to promote a healthy condition of the soles of the feet, causing the skin to be in a natural state, not too warm nor heated, as when perspiration is checked, but moist and soft to the touch.

The composition of matter by means of which I produce the result desired is made and composed as follows: I take of cayenne powder, or its equivalent, about one-half an ounce avoirdupois; of powdered alum, about one ounce avoirdupois, and of persimmon-bark, powdered or pulverized, about twelve ounces avoirdupois. These ingredients are thoroughly mixed together dry, when the composition is immediately ready for use.

It is applied by the patient as follows: Take of the mixture as much as one can easily seize between the thumb and finger and sprinkle the same upon the inside of the boots or shoes which he is about to wear, using about that quantity for each boot or shoe. The patient, on wearing such boots or shoes thereafter, will be relieved from active perspiration of the feet, and consequently from the bad odors which arise from sweating feet. It is advisable to apply the powder at first in small quantities, and the application may be repeated in two or three days, and afterward as often as occasion requires.

It is not recommended to apply the powder in such a manner as that it will be in direct contact with the skin, although no hurtful consequences will follow from that mode of application.

The composition must be kept dry and shut up in tight boxes of metal or in other suitable closed vessels.

I claim as new and desire to secure by Letters Patent—

The composition above described, compounded of the ingredients mentioned, or of their known equivalents, substantially as and for the purpose herein set forth.

The above specification of my invention signed by me this 16th day of September, 1865.

SAMUEL P. CLAYTON.

Witnesses:
M. M. LIVINGSTON,
C. L. TOPLIFF.